INVENTOR.
EMIL A. M. KITTL
BY Harry M. Saragovitz
ATTORNEY

United States Patent Office 2,811,688
Patented Oct. 29, 1957

2,811,688

DIRECT CURRENT TO ALTERNATING CURRENT INVERTERS

Emil A. M. Kittl, Eatontown, N. J., assignor to the United States of America as represented by the Secretary of the Army Application April 3, 1956, Serial No. 575,913

8 Claims. (Cl. 321—49)

(Granted under Title 35, U. S. Code (1952), sec. 266)

The invention described herein may be manufactured and used by or for the Government for governmental purposes without the payment of any royalty thereon.

The invention herein relates to electromechanical inverter systems for transforming D. C. to A. C. power.

It is an object of the invention to provide an improved electrical starting circuit for electromechanical inverters.

It is another object of the invention to provide a new and improved driving mechanism for an electromechanical type inverter.

It is another object of the invention to provide a circuit which controls the frequency of the alternating current output wave of an electromechanical type of inverter system.

It is still another object of the invention to provide an electromechanical type inverter system which has a smooth controllable alternating current output wave.

Other objects and advantages will be apparent from the following detailed description and accompanying drawings, wherein.

To provide self-starting in inverter systems of this type it is necessary to close either one of the D. C. paths through the associated A. C. transformer input circuit. In accordance with the instant invention this is accomplished by temporarily reducing the impedance of the portion of the switch control circuit through which a current flow will close a magnetic switch, which in turn will close one of the D. C. paths, and at the same time supply a starting potential to the control circuit so that current flows through the said portion. Thereafter, a modified transformer output will control the alternating closing of the circuit.

Figure 1:
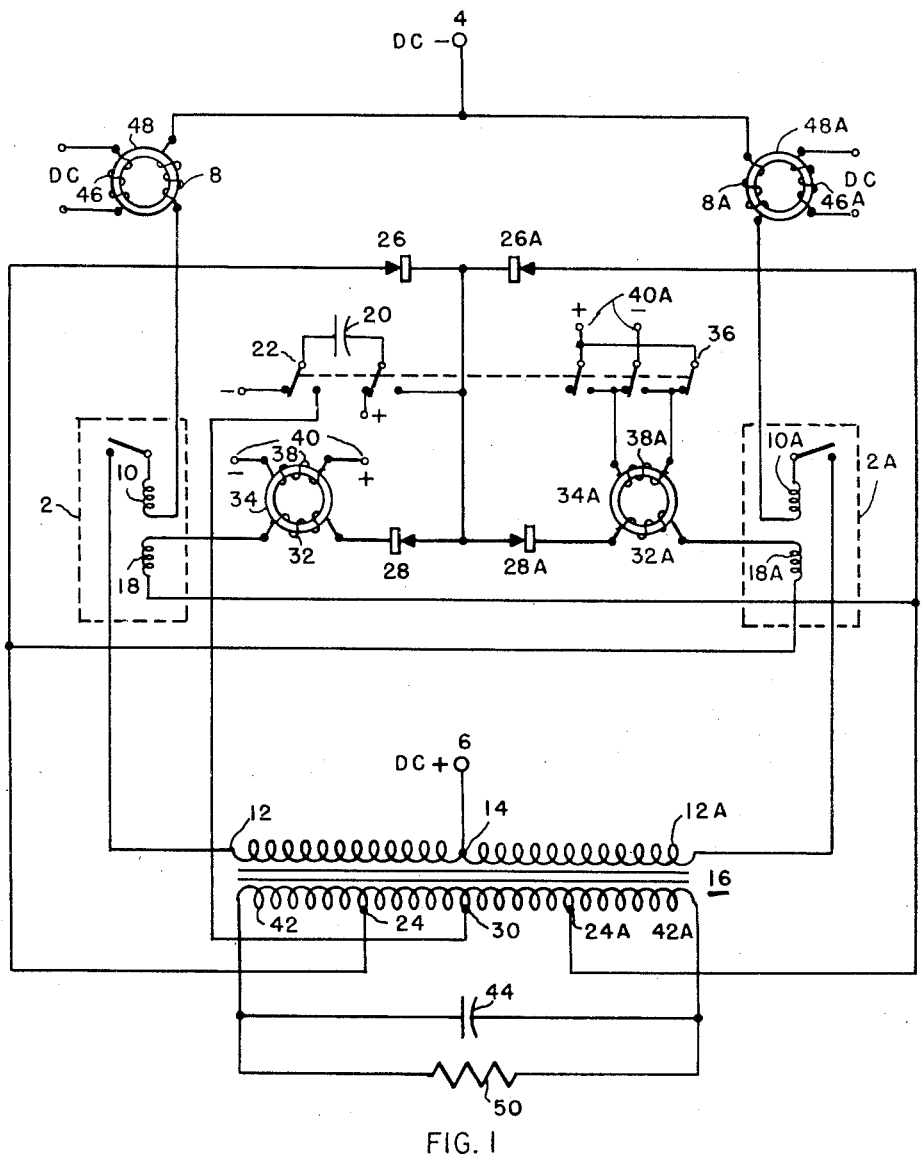
Fig. 1 is a schematic diagram of one embodiment of the invention.

In Fig. 1 either magnetic switch 2 or 2A, normally biased to an open position by a spring (not shown), can be initially automatically operated to a closed position. As shown, switch 2A is to be closed. It is to be observed that this starting means must be such that its effect will be of optimum duration. The effect must last long enough to initially firmly close the switch, but not so long as to extend beyond the first overlap of the two half cycles of operation and interfere with normal running operation. The invention herein meets the foregoing requirements.

The basic inverter circuit shown in Fig. 1 consists of a D. C. power source with terminals 4 and 6 connected to an A. C. transformer 16 by magnetic switches 2 and 2A which alternately reverse the polarity of the input voltage to the transformer. The primary winding of the transformer has a center tap 14 and end terminals 12 and 12A. The secondary has a center tap 30, end terminals 42 and 42A, and symmetrical intermediate taps 24 and 24A. The commutating capacitor 44 and load 50 are connected across secondary terminals 42 and 42A.

An input D. C. voltage source is connected to the transformer with the positive terminal connected continuously to the primary center tap 14 and the negative terminal alternately connected to the primary end terminals, 12 and 12A. In series with the negative potential terminal and primary end terminal 12 is saturable reactor winding 8 of reactor 48, hold-closed coil 10 and the contact points (when closed) of switch 2. Similarly, in series with the negative potential terminal and primary end terminal 12A is saturable reactor winding 8A of reactor 48A, hold-closed coil 10A and contact points (when closed) of switch 2A. Reactors 48 and 48A have second windings 46 and 46A and each are biased with D. C. current to produce a retarding effect on initial current rises (or drops at low current levels) through windings 8 and 8A.

The magnetic switches 2 and 2A, normally spring biased open, are alternately closed by current flowing through two oppositely polarized current paths energized by connection across secondary terminals 24 and 24A. One of these paths, polarized by rectifiers 26 and 28 leads through winding 32 of saturable reactor 34 and the closing coil 18 of switch 2. The other, polarized by rectifiers 26A and 28A leads through winding 32A of saturable reactor 34A and the closing coil 18A of switch 2A.

Reactors 34 and 34A each have a second winding, 38 and 38A. A D. C. biasing current is applied directly to winding 38 via terminal pair 40 and through terminal pair 40A and polarity reversing switch 36 to winding 38A.

Capacitor 20 is initially connected through switch 22, in the shown position, to a D. C. charging source.

Prior to starting, the bias applied to reactor 34 is such as to produce a near saturation flux which will substantially oppose initially a rising current flow through winding 32. At the same time, with switch 36 in the shown position, the bias on reactor 34A is of opposite polarity and the flux is at a near saturation point in a direction which will not oppose a current through winding 32A.

To start the inverter, switches 22 and 36, which are ganged for simultaneous operation, are thrown to a position opposite of that shown. It will be noted that as reconnected, capacitor 20 has two control circuit current discharge paths, one path leads through rectifier 28, reactor winding 32, closing coil 18 of switch 2 and across the portion of the transformer secondary between terminals 24A and 30. The other path leads through rectifier 28A, reactor winding 32A, closing coil 18A of switch 2A, and the portion of the transformer secondary between terminals 24 and 30. Due to the latter path offering a lower impedance because of the previously noted effect of biased reactor 34A, the principal current will flow through it and energize only closing coil 18A to close switch 2A. Although with switch 36 in the new position the bias potential is reversed on winding 38A of reactor 34A and this bias will in time cause the flux to change to a polarity which will oppose the capacitor current flowing through associated winding 32A, the effect of the latter current as it rises, occurring faster than the flux reversal, produces a compensating flux which prevents a change in net flux, whereby the original saturation condition is retained, and the starting current from capacitor 20 is not substantially impeded.

With the closing of switch 2A, by the discharge current from capacitor 20, the holding coil 10A, powered by transformer input current flowing through the contacts of this switch takes over the job of holding these contacts closed.

The negative terminal 4 of the D. C. potential source is now connected to transformer primary terminal 12A and positive terminal to primary center point 14. The polarity of secondary end terminal 42 will go positive with respect to the other end terminal 42A. Commutating capacitor 44, connected across these terminals, will charge to a corresponding potential. At the same time control voltage terminal 24 of the secondary will go positive with respect to control voltage terminal 24A.

As a result of the control voltage polarity, current starts to flow from terminal 24 through rectifiers 26 and 28, reactor winding 32, closing coil 18, back to transformer terminal 24A. As this current increases it encounters considerable impedance in reactor winding 32, initially preventing sufficient current from flowing to energize closing coil 18. However, once sufficient current flows to produce a resaturation, the current rises sharply and closing coil 18 is energized and switch 2 closes its contacts. Just prior to closing, it will be noted that the difference in potential across the contacts will be twice the source potential due to the autotransformer effect produced by virtue of the source voltage being applied across half-primary terminals 14 (plus) and 12A (minus). To prevent an extreme current surge through the contact points of switch 2 while closing, the movable contact of switch 2 is connected through winding 8 of saturable reactor 48 which is biased to oppose initial current flow. This opposition continues until the input current produces a desaturation. In this way the initial high voltage difference is across the reactor and not across the switch contacts while the switch is closing. Current surges through the contacts of switch 2A are similarly prevented by reactor winding 48A. With switches 2 and 2A closed, both ends of the transformer primary are connected to the same potential point and the voltage across the transformer commences to drop to zero. The commutating capacitor 44 at the same time commences discharging across the secondary and slows the drop.

The next reaction is that the current through switch holding coil 10A and reactor winding 8A of reactor 48A drops sufficiently to desaturate the core of reactor 48A, causing a sudden increase in reactor impedance and producing a sudden decrease in current through said holding coil and switch 2A opens. This allows the voltage at terminal 12 of transformer 16 to commence rising in a negative direction with respect to center tap 14. The commutating capacitor 44 commences charging in the opposite direction and in doing so loads the circuit and slows the rise rate as it did the decrease rate in the preceding half cycle. Holding coil 10 takes over to hold switch 2 closed. The control voltage at terminal 24A is now rising in a positive direction with respect to terminal 24 and current commences to flow from terminal 24A through rectifiers 26A and 28A, reactor coil 32A, closing coil 18A, to transformer terminal 24. As this current increases it encounters impedance in reactor coil 32A, initially preventing sufficient current to flow to energize closing coil 18A. By this time the polarity reversal of the biasing field has been completed and the same condition of opposition biasing flux is applied to reactor 34A as reactor 34. As the current increases a point is reached where resaturation of the reactor core occurs and the current rises sharply, energizing closing coil 18A and thereby closing switch 2A. Finally, the current through holding coil 10 and reactor winding 8 of reactor 48 drops sufficiently to desaturate the core of reactor 48 causing a rapid increase in reactor impedance and producing a sudden decrease in current through said holding coil, whereupon switch 2 opens completing a full cycle of operation and the inverter has been started. Subsequent operation continues in the same sequence with the inverter delivering an alternating voltage to the load represented by resistor 50.

Figure 2:
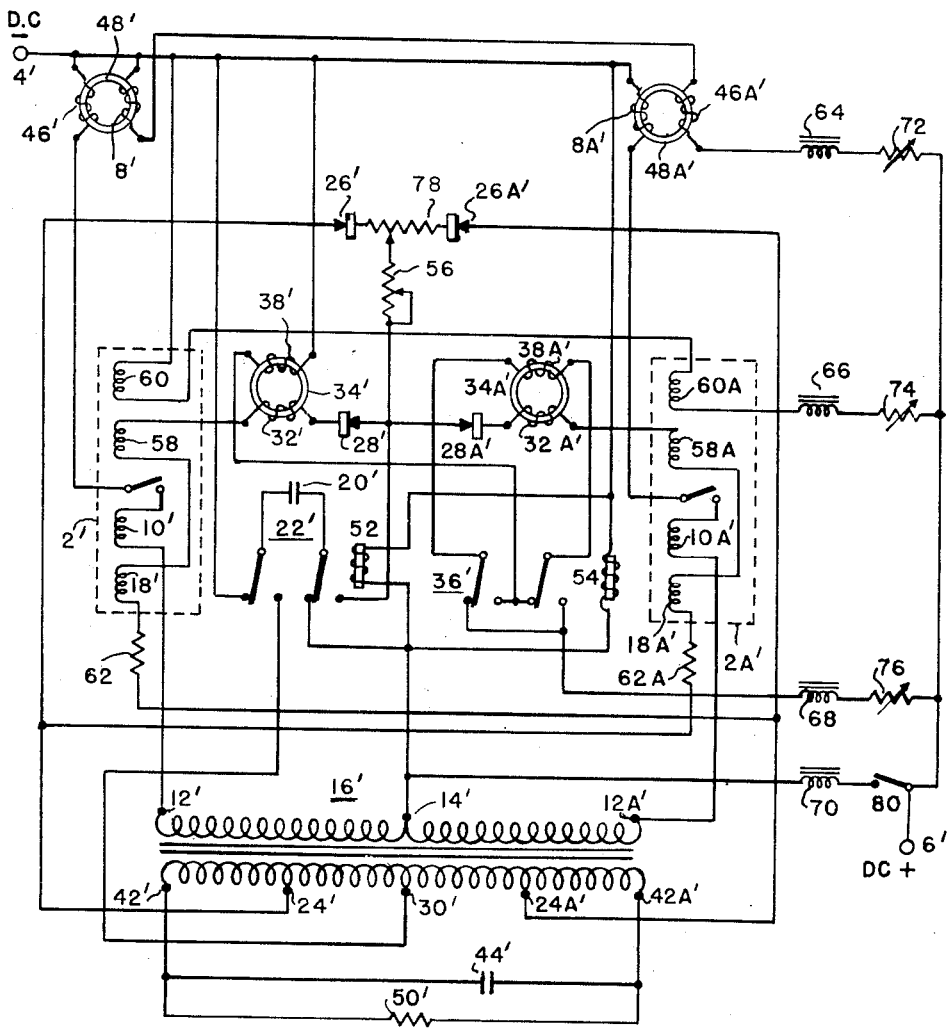
Fig. 2 is a schematic diagram of a circuit similar to that of Fig. 1 with additional refinements.

Fig. 2 contains an inverter combining the basic circuit of Fig. 1 and certain improved features. Elements in Fig. 2 having the same structure and function as those in Fig. 1 carry the same number with a prime suffix added.

As previously noted, the potential on capacitor 20' is seen by both switch control circuits, and the magnitude of this potential effects the firing time of the switches. To vary this and thus the frequency, adjustable resistor 56 has been inserted in series with the capacitor which on adjustment varies the charging current to the capacitor and thereby the capacitor potential.

Magnetic closing coils 52 and 54, connected in parallel, have been added to switches 22' and 36'.

More effective input power switching means are employed which include the additional closing coils 58 and 58A and hold-open coils 60 and 60A which may either supplement or replace the hold-open springs specified for the associated switches in Fig. 1.

Current limiting resistors 62 and 62A have been inserted in series with the control current paths. Smoothing reactors 64, 66, 68, and 70 are incorporated in the D. C. inputs to improve the waveform. Adjustable biasing resistors 72, 74, and 76 are included and provide fine control over frequency and waveform characteristics. Potentiometer 78 balances the control voltage between the switches 2' and 2A' to assist in producing balanced phase output.

The manner and sequence of operation of the embodiment in Fig. 2 is similar to that of the embodiment in Fig. 1. It is to be noted that in Fig. 2, by means of switch 80 the D. C. input is simultaneously applied to the power input circuit, to capacitor 20' through the contacts of capacitor switch 22', and to switching coils 52 and 54. The charging of capacitor 20' before the switching of this capacitor to its discharge position by switch 22' occurs by virtue of the natural relative speeds of these two actions, the charging being completed before the magnetic field of the associated magnetic coil 52 rises sufficiently to force open the switch contacts through which the charging potential is applied.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A direct-current to alternating-current inverter comprising in combination a transformer, two direct-current alternately acting magnetic switches for alternating applying current from a direct current source in opposite directions across said transformer, a direct-current closing coil and coil energizing circuit associated with each magnetic switch, said energizing circuits having a like impedance and connecting said closing coils in opposite phase to said transformer, and an inverter starting means for initially closing one of said switches, said means comprising impedance changing means for changing the magnitude of the impedance of one of said current energizing circuits with respect to the other, and starting potential means for applying a direct-current closing polarity potential to both current energizing circuits simultaneously, said starting means being self-limiting in effectiveness for less than one cycle of inverter operation.

2. An inverter as set forth in claim 1, in which the said impedance changing means comprises an inductive reactor with a first and second winding, said first winding being in series with one of said coil energizing circuits, said second winding being adapted to be connected to a D. C. source, and switching means for reversing the polarity of said potential to said second winding.

3. A inverter as set forth in claim 2, in which the starting potential means comprise a capacitor and switching means for successively charging said capacitor and connecting said capacitor to said both said current energizing circuits.

4. A self-controlled D. C. to A. C. inverter comprising in combination first and second input magnetic switches respectively having first and second closing coils, a transformer adapted to receive D. C. power alternately from said first and second magnetic switches and to deliver an output alternating current to a work circuit, a winding on said transformer having at least a first and second taps and a mid-tap there between, a rectifier circuit for providing first and second oppositely polarized current paths between said first and second taps and having a common path which joins said first and second paths, currents from said first and second paths flowing in one direction over said common path, first and second saturable reactors, first and second windings associated with said first reactor and first and second windings associated with said second reactor, said first closing coil and said first winding of said first reactor being in series with said first polarized current path, said first winding of said second reactor and said second closing coil being in series with said second polarized current path, means for providing opposite in polarity biasing potentials to the said second winding of said first and second reactors, capacitor means including a capacitor and a means for applying a charge to same, switching means for reversing the polarity of the said biasing potential applied to one of said reactors and for simultaneously connecting said capacitor between a point on said common path and said mid-tap.

5. An inverter as set forth in claim 4, in which each of the said first and second magnetic switches includes a hold-closed coil connected in series with the circuit through the switch contacts.

6. An inverter as set forth in claim 5, in which the series path through each of said hold-closed coils includes a saturable inductive reactor.

7. An inverter as set forth in claim 6, including a potentiometer having two end terminals and an adjustable intermediate terminal, the said end terminals being connected between said polarized current paths, and said adjustable intermediate terminal being connected to said common current path.

8. An inverter as set forth in claim 7, including a variable resistor in said common path.

References Cited in the file of this patent

UNITED STATES PATENTS

| | | |
|---|---|---|
| 2,338,208 | Shaver | Jan. 4, 1944 |
| 2,410,974 | Huetten | Nov. 12, 1946 |
| 2,756,381 | Rolf | July 24, 1956 |